(12) United States Patent
Yamaguchi (10) Patent No.: US 12,414,612 B2
(45) Date of Patent: Sep. 16, 2025

(54) BUCKLE DEVICE

(71) Applicant: KABUSHIKI KAISHA TOKAI-RIKA-DENKI-SEISAKUSHO, Aichi-ken (JP)

(72) Inventor: Ryuji Yamaguchi, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days.

(21) Appl. No.: 18/441,634

(22) Filed: Feb. 14, 2024

(65) Prior Publication Data
US 2024/0268526 A1    Aug. 15, 2024

(30) Foreign Application Priority Data
Feb. 15, 2023   (JP) .................. 2023-022015

(51) Int. Cl.
  *A44B 11/25*   (2006.01)
  *B60R 22/00*   (2006.01)

(52) U.S. Cl.
  CPC ...... *A44B 11/2553* (2013.01); *A44B 11/2546* (2013.01); *B60R 22/00* (2013.01); *Y10T 24/40* (2015.01)

(58) Field of Classification Search
  CPC . A44B 11/25; A44B 11/2503; A44B 11/2546; A44B 11/2553; A44B 11/2557; A44B 11/006; A44B 11/2576; A44B 11/00; B60R 2022/1806; B60R 2022/263; B60R 2022/266; B60R 22/18; B60R 22/22; B60R 22/24; B60R 22/26; B60R 22/00; Y10T 24/40; Y10T 24/4002; Y10T 24/4028; A62B 35/00
  USPC ....... 280/801.1, 808; 24/164, 175, 197, 200, 24/302, 163 R; 297/482, 468; 180/268
  See application file for complete search history.

(56) References Cited

U.S. PATENT DOCUMENTS

| | | | | |
|---|---|---|---|---|
| 3,841,658 | A | * | 10/1974 | Singh ............... B60R 22/02 297/474 |
| 2016/0214567 | A1 | * | 7/2016 | Harada ............... B60R 22/18 |
| 2020/0130638 | A1 | | 4/2020 | Futamura et al. |

FOREIGN PATENT DOCUMENTS

| | | | | |
|---|---|---|---|---|
| JP | H0523914 | U | * | 3/1993 |
| JP | 2001071863 | A | * | 3/2001 |
| JP | 2010036735 | A | * | 2/2010 |
| JP | 2011020562 | A | * | 2/2011 |
| JP | 2016222071 | A | * | 12/2016 |
| JP | 2017114416 | A | * | 6/2017 |
| JP | 2020-066332 | A | | 4/2020 |

* cited by examiner

*Primary Examiner* — Keith J Frisby
(74) *Attorney, Agent, or Firm* — Studebaker Brackett PLLC (57) ABSTRACT

In a buckle device, a buckle body is held in an upper part of a boot, and a lower part of the boot is supported from the lower side by a frame and a protector. Here, an upper left inclination surface of the boot and the lower left inclination surface of the protector are inclined in a downward direction as being directed inward in the right-left direction of the boot. Therefore, in a case in which a load is input to the boot from the upper side, it is possible to apply a displacement force to the boot inward in the right-left direction of the protector, and to suppress the downward displacement of the boot with respect to the frame and the protector.

10 Claims, 9 Drawing Sheets

BUCKLE DEVICE

CROSS-REFERENCE TO RELATED APPLICATION

This application is based on and claims priority under 35 USC 119 from Japanese Patent Application No. 2023-022015 filed on Feb. 15, 2023, the disclosure of which is incorporated by reference herein.

BACKGROUND

Technical Field

The present invention relates to a buckle device in which a holding member holds a buckle body and a support supports the holding member.

Related Art

In the buckle device disclosed in Japanese Patent Application Laid-Open (JP-A) No. 2020-66332, a boot holds a buckle body and an anchor supports the boot.

Here, in the buckle device, it is preferable that the displacement of the boot to the anchor side can be suppressed.

SUMMARY

In view of such circumstances, an object of the invention is to obtain a buckle device capable of suppressing displacement of a holding member to a support side.

According to a first aspect of the invention, a buckle body configured to engage with a tongue provided at a webbing attached to an occupant; a holding member that holds the buckle body and is provided with a support target surface; a support that is provided with a support surface and supports the holding member in a manner such that the support surface supports the support target surface; and an inclination part that is provided at at least one of the support target surface or the support surface and is inclined in a direction from a buckle body side toward a support side as being directed inward in a holding-member thickness direction.

In the buckle device in the first aspect of the invention, the buckle body is configured to engage with the tongue provided at the webbing attached to the occupant. The holding member holds the buckle body, the support surface of the support supports the support target surface of the holding member, and the support supports the holding member.

Here, the inclination part of at least one of the support target surface or the support surface is inclined in a direction from the buckle body side toward the support side as being directed inward in the holding-member thickness direction. Therefore, it is possible to suppress displacement of the holding member to the support side.

In a buckle device according to a second aspect of the invention, in the buckle device according to the first aspect of the invention, the inclination part is provided at the support target surface and the support surface.

In the buckle device according to the second aspect of the invention, the inclination part is provided at the support target surface and the support surface. Therefore, it is possible to effectively suppress the displacement of the holding member to the support side.

In a buckle device according to a third aspect of the invention, in the buckle device according to the second aspect of the invention, the inclination part at the support surface supports the inclination part at the support target surface.

In the buckle device according to the third aspect of the invention, the inclination part at the support surface supports the inclination part at the support target surface. Therefore, it is possible to effectively suppress the displacement of the holding member to the support side.

In a buckle device according to a fourth aspect of the invention, in the buckle device according to any one of the first to third aspects of the invention, the inclination part is provided on both sides in the holding-member thickness direction.

In the buckle device according to the fourth aspect of the invention, the inclination part is provided on both sides in the holding-member thickness direction. Therefore, it is possible to effectively suppress the displacement of the holding member to the support side.

In a buckle device according to a fifth aspect of the invention, in the buckle device according to any one of the first to fourth aspects of the invention, a plurality of inclination parts are provided on one side in the holding-member thickness direction.

In the buckle device according to the fifth aspect of the invention, the plurality of the inclination parts are provided on one side in the holding-member thickness direction. Therefore, it is possible to effectively suppress the displacement of the holding member to the support side.

In a buckle device according to a sixth aspect of the invention, in the buckle device according to any one of the first to fifth aspects of the invention, the support target surface and the support surface are not provided on both sides of the inclination part in a holding-member circumferential direction.

In the buckle device according to the sixth aspect of the invention, the support target surface and the support surface are not provided on both sides of the inclination part in the holding-member circumferential direction. Therefore, even in a case in which the support target surface and the support surface are not provided on both sides of the inclination part in the holding-member circumferential direction, it is possible to suppress the displacement of the holding member to the support side by the inclination part.

A buckle device according to a seventh aspect of the invention in the buckle device according to any one of the first to sixth aspects of the invention further includes an accommodation part that is provided at the holding member and accommodates the support, an exposure hole that is provided at a side wall of the accommodation part and exposes the support, and a covering part that is provided at the side wall and covers the support.

In the buckle device according to the seventh aspect of the invention, the support is accommodated in the accommodation part of the holding member, and the exposure hole of the side wall of the accommodation part exposes the support.

Here, the covering part of the side wall of the accommodation part covers the support. Therefore, in a case in which the holding member is displaced to the support side, it is possible to suppress an occurrence of a situation in which the support comes out from the exposure hole of the side wall of the accommodation part, by the covering part, and to suppress the displacement of the holding member to the support side.

A buckle device according to an eighth aspect of the invention includes a buckle body configured to engage with a tongue provided at a webbing attached to an occupant; a holding member that holds the buckle body and is provided with an accommodation part; a support that is accommodated in the accommodation part and supports the holding member; an exposure hole that is provided at a side wall of the accommodation part and exposes the support; and a covering part that is provided at the side wall and covers the support.

In the buckle device in the eighth aspect of the invention, the buckle body is configured to engage with the tongue provided at the webbing attached to the occupant. The holding member holds the buckle body, the accommodation part of the holding member accommodates the holding member, and the support supports the holding member. The exposure hole of the side wall of the accommodation part exposes the support.

Here, the covering part of the side wall of the accommodation part covers the support. Therefore, in a case in which the holding member is displaced to the support side, it is possible to suppress an occurrence of a situation in which the support comes out from the exposure hole of the side wall of the accommodation part, by the covering part, and to suppress the displacement of the holding member to the support side.

BRIEF DESCRIPTION OF THE DRAWINGS

Exemplary embodiments of the present invention will be described in detail based on the following figures, wherein.

DETAILED DESCRIPTION

Figure 1:
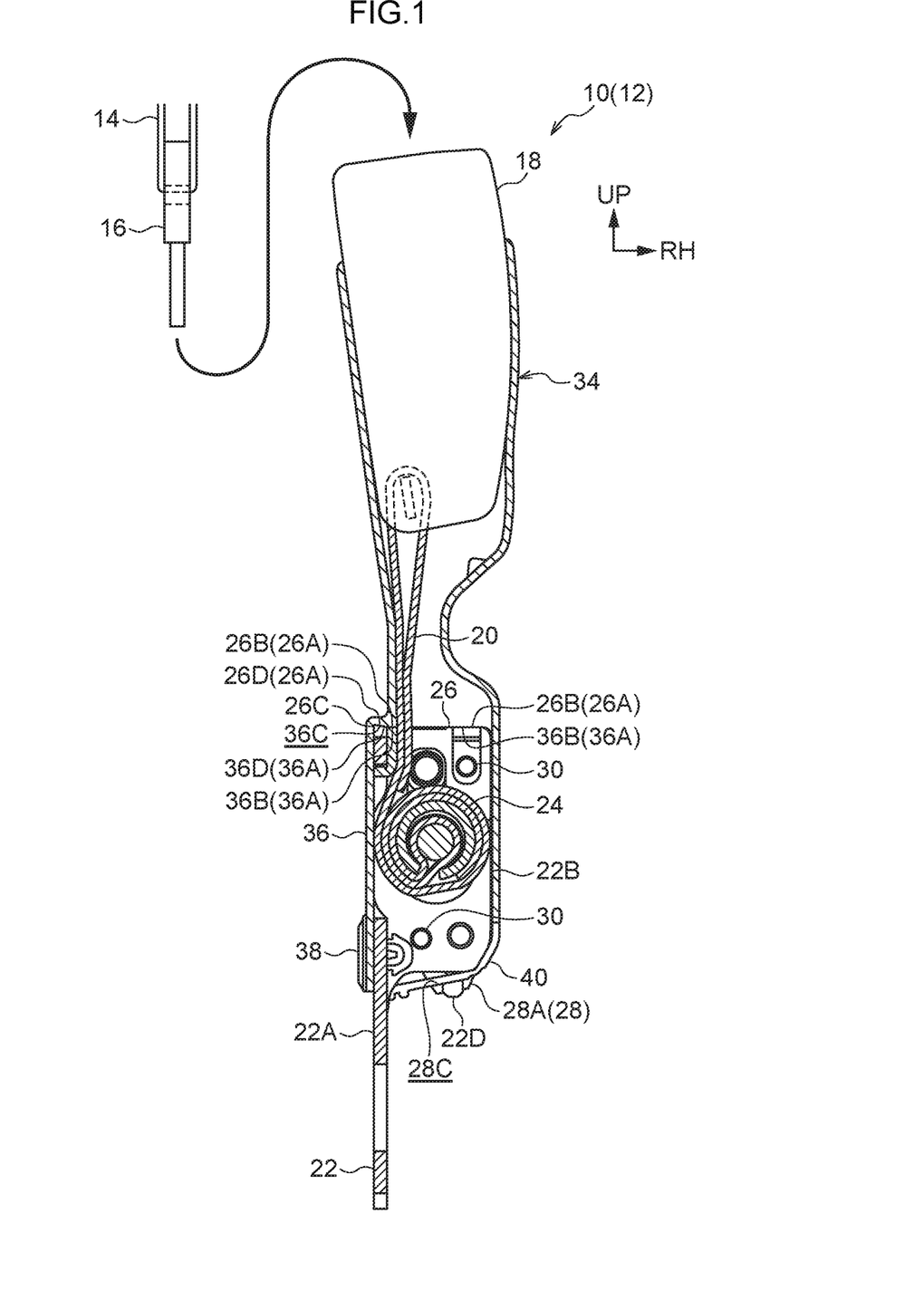
FIG. 1 is a cross-sectional view illustrating a buckle device according to an embodiment of the invention as viewed from a rear.

FIG. 1 is a cross-sectional view illustrating a buckle device 10 according to an embodiment of the invention as viewed from the rear. In the drawings, the front of the buckle device 10 is indicated by an arrow FR, the right (obverse side) of the buckle device 10 is indicated by an arrow RH, and the upper side of the buckle device 10 is indicated by an arrow UP.

The buckle device 10 according to the present embodiment constitutes a seat belt device 12 of a vehicle (automobile). The seat belt device 12 is applied to a seat (not illustrated) in a vehicle interior. The seat belt device 12 is provided with a winding device (not illustrated). The winding device is installed on the vehicle width direction outer side and the lower side of a seat rear part. In the winding device, a webbing 14 (see FIG. 1) having a long band shape is wound from the proximal end side. A webbing 14 is biased to the winding side to the winding device and pulled out upward from the winding device. The winding device is provided with a lock mechanism, and the lock mechanism locks pulling-out of the webbing 14 from the winding device in an emergency of the vehicle (in collision or the like).

The webbing 14 passes through a through anchor (not illustrated) movably on the distal end side with respect to the winding device. The through anchor is installed on the vehicle width direction outer side and the upper side of the seat rear part. An anchor (not illustrated) is fixed to the distal end part of the webbing 14, and the anchor is installed on the vehicle width direction outer side and the lower side of the seat rear part. The webbing 14 movably passes through a tongue 16 (see FIG. 1) between the through anchor and the anchor.

The buckle device 10 is installed on the inner side and the vehicle width direction lower side of the seat rear part. The front, the right, and the upper side of the buckle device 10 are directed toward the front side or the rear side, and directed inward in the vehicle width direction, and directed upward, respectively.

As illustrated in FIG. 1, a buckle body 18 having a substantially rectangular parallelepiped shape is provided at an upper part of the buckle device 10. The tongue 16 is engageable with the buckle body 18 from the upper side. The tongue 16 is engaged with the buckle body 18, and the webbing 14 is attached to an occupant seated on the seat. As a result, a part (shoulder webbing) of the webbing 14 between the through anchor and the tongue 16 is stretched obliquely from the shoulder part to the waist part (including the chest part) of the occupant, and a part (wrap webbing) of the webbing 14 between the tongue 16 and the anchor is stretched laterally to the waist part of the occupant. The engagement of the tongue 16 with the buckle body 18 is releasable. The engagement of the tongue 16 with the buckle body 18 is released to release the attachment of the webbing 14 to the occupant. The lower side part of the buckle body 18 gradually becomes smaller downward in the right-left direction.

A buckle switch (not illustrated) as a detection unit is provided in the buckle body 18. The buckle switch detects the engagement of the tongue 16 with the buckle body 18 and detects the attachment of the webbing 14 to the occupant. A plurality of buckle switches may be provided.

A distal-end side part (upper side part) of a band-shaped belt 20 (webbing) as a coupling member is coupled to the lower part of the buckle body 18. The belt 20 is made of, for example, the same material as the material of the webbing 14 and made into a woven fabric.

A frame 22 that is made of metal as a support member constituting a support is provided in a lower part of the buckle device 10, and the frame 22 is made to have a U-shaped plate shape in a cross section. A back plate 22A is provided at a left part of the frame 22. The frame 22 is fixed to a vehicle body side (for example, a rear part of a seat lower part) at a lower end part of the back plate 22A. Leg plates 22B and 22C are provided at the front part and the rear part of the frame 22, respectively. The leg plates 22B and 22C protrude rightward from the back plate 22A. A hook protrusion 22D having an L-shaped plate shape as a hook part is integrally formed at the right part of the lower surface of the leg plate 22B. The hook protrusion 22D protrudes downward and has a distal end part (lower end part) that protrudes leftward.

A spool 24 that is made of metal and has a substantially cylindrical shape as a winding shaft passes through the leg plates 22B and 22C of the frame 22. The spool 24 is supported by the frame 22. The axial direction of the spool 24 is parallel to the front-rear direction, and the spool 24 is made rotatable about the central axis. A proximal-end side part (lower side part) of the belt 20 is coupled to the spool 24. The belt 20 is wound around the spool 24 and pulled out upward from the left side of the spool 24.

A protector 26 (see FIGS. 6A, 6B, 7A, and 7B) that is made of resin as a covering member constituting the support is fitted into an upper part of the frame 22. The protector 26 is made to have a U-shape in top view. The inside of the protector is opened to the right side, and the left wall, the front wall, and the rear wall of the protector 26 cover the back plate 22A, the leg plate 22B, and the leg plate 22C of the frame 22, respectively. The upper end part of the protector 26 is made to serve as an upper wall. The upper wall of the protector 26 protrudes to the outside of the protector 26 and is placed on the upper side of the frame 22. A part of the front part and a part of the rear part of the protector 26 are made to have an inverted J-shape in cross section. The leg plate 22B and the leg plate 22C are fitted into these parts, respectively. The belt 20 is inserted into the protector 26, and the protector 26 restricts the contact of the belt 20 with the frame 22.

A lower support surface 26B that constitutes a support surface 26A and has a substantially L-shape in top view is formed on the upper surfaces of the front part and the left part of the upper wall of the protector 26. The lower support surface 26B is disposed vertically in the up-down direction. A predetermined number (two in the embodiment) of support bases 26C having a substantially trapezoidal columnar shape are formed at the left side part of the upper wall left part of the protector 26. The predetermined number of support bases 26C extend in the front-rear direction and are separated from each other. A lower-left inclined surface 26D as an inclination part constituting the support surface 26A is formed on the upper surface of the support base 26C. The lower-left inclined surface 26D is inclined in a downward direction as being directed to the right (the inner side of the protector 26 in the right-left direction). A support column 26E having a substantially rectangular columnar shape is integrally formed at the right end part of the upper wall rear part of the protector 26. The support column 26E protrudes upward. A lower-right inclined surface 26F as the inclination part constituting the support surface 26A is formed on the upper surface of the support column 26E. The lower-right inclined surface 26F is inclined in a downward direction as being directed to the left (the inner side of the protector 26 in the right-left direction).

A case 28 (see FIGS. 3, 5A, 5B, and 5C) that is made of metal as a mounting member is disposed on the front side of the frame 22 (leg plate 22B). The case 28 is provided with a locking plate 28A having a substantially rectangular plate shape. The case 28 is mounted to the leg plate 22B by fixing the upper part and the lower part of the locking plate 28A to the leg plate 22B with screws 30. A locking hole 28C having a rectangular cross section as a locking part is formed at the lower end part of the locking plate 28A, and the locking hole 28C is opened rearward. The locking hole 28C extends in a downward direction as being directed leftward. Both ends of the locking hole 28C in the longitudinal direction are opened. A locking cylinder 28B having a substantially bottomed cylindrical shape is integrally formed on the front side of the locking plate 28A. The axial direction of the locking cylinder 28B is parallel to the front-rear direction. The inside of the locking cylinder 28B penetrates the locking plate 28A and is opened to the rear side of the locking plate 28A. The front part of the spool 24 is coaxially inserted into the case 28.

Figure 4:
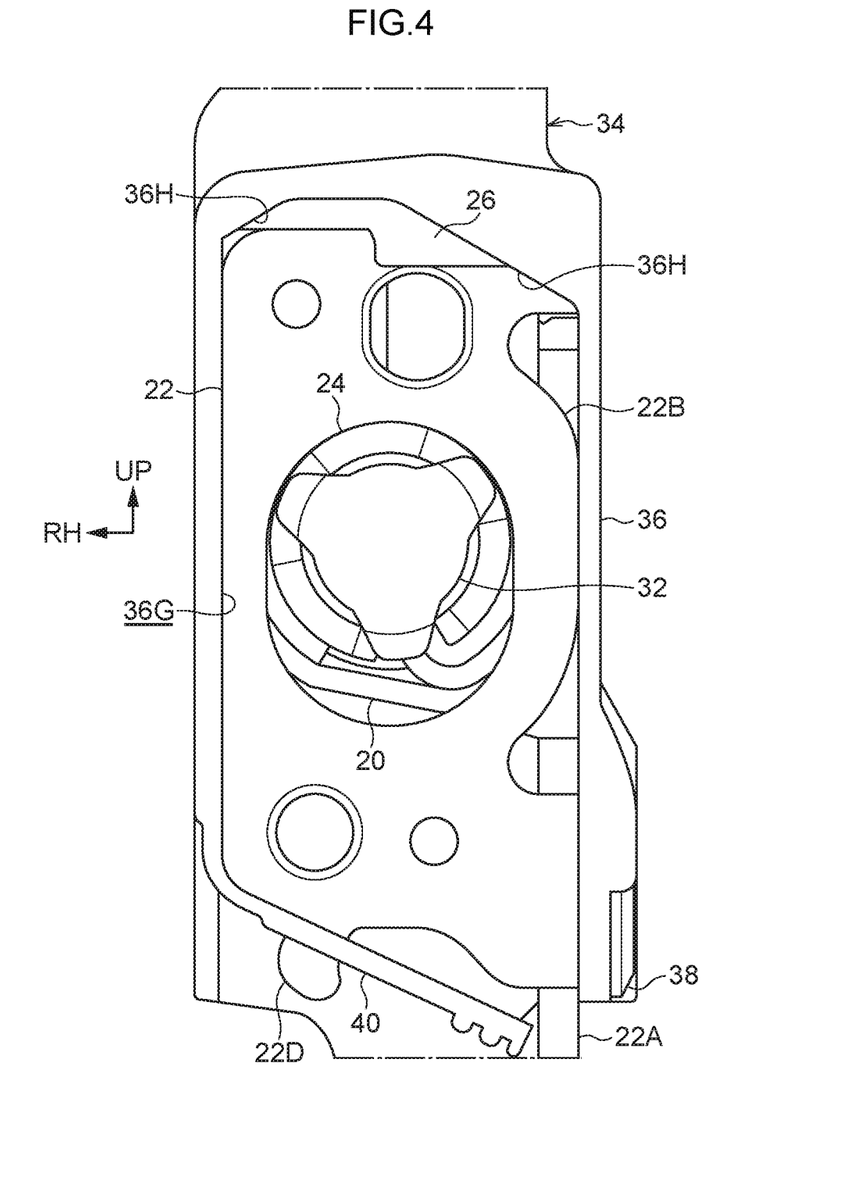
FIG. 4 is a front view illustrating a frame, a boot, and the like of the buckle device according to the embodiment of the invention as viewed from the front.
Figure 5A:
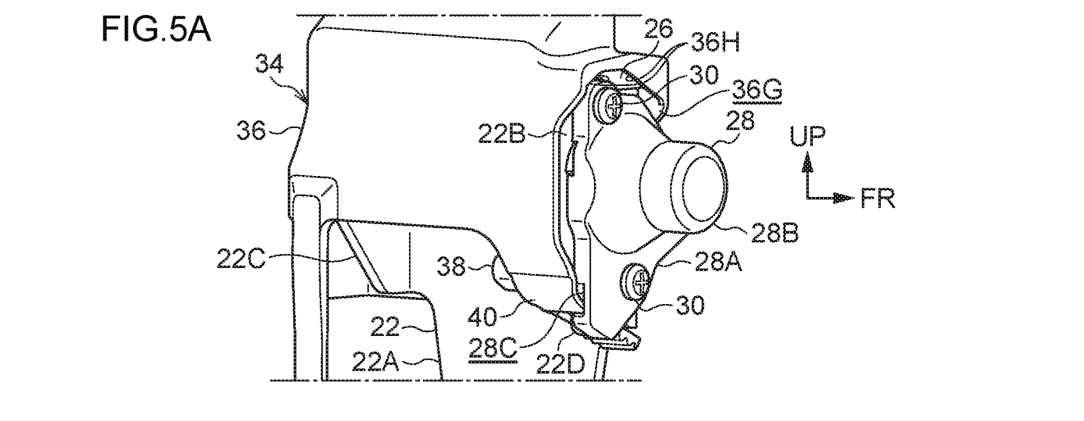
FIG. 5A is a perspective view illustrating the buckle device according to the embodiment of the invention as viewed from a diagonally front right.
Figure 5B:
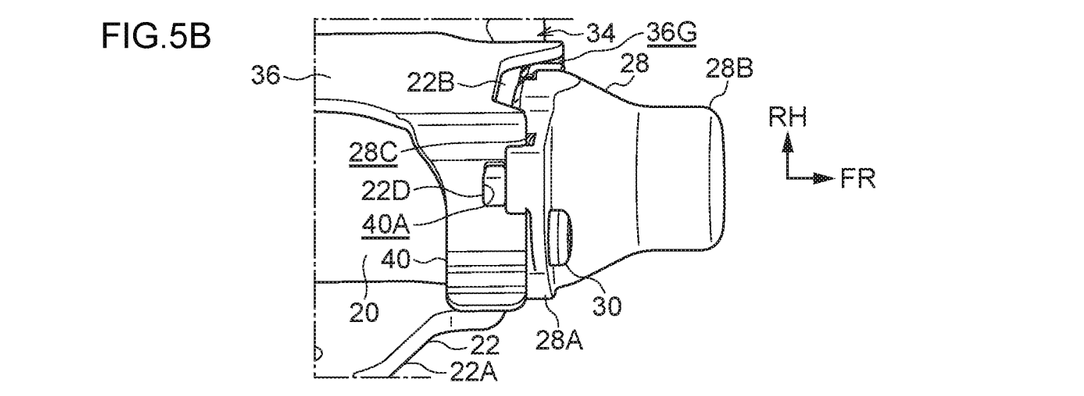
FIG. 5B is a perspective view illustrating the buckle device according to the embodiment of the invention as viewed from a diagonally bottom right.
Figure 5C:
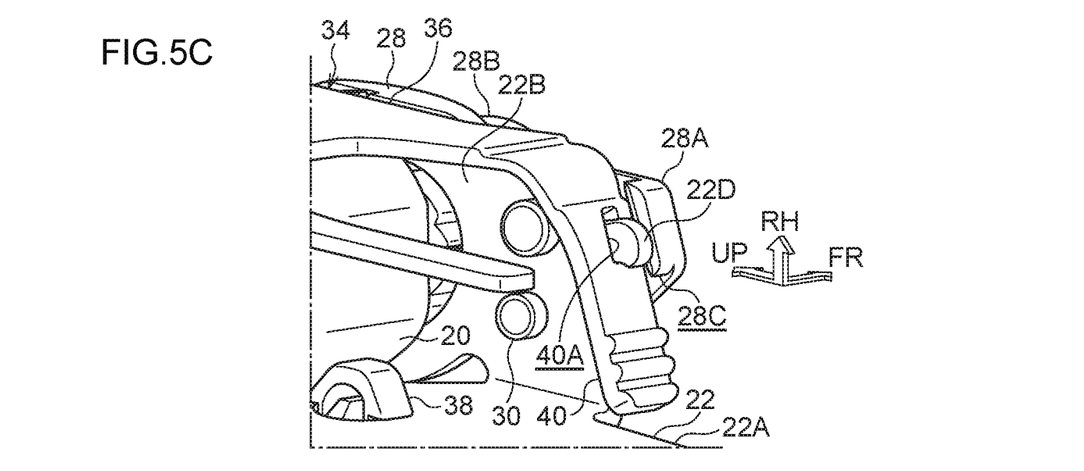
FIG. 5C is a perspective view illustrating the buckle device according to the embodiment of the invention as viewed from a diagonally rear bottom.
Figure 6A:
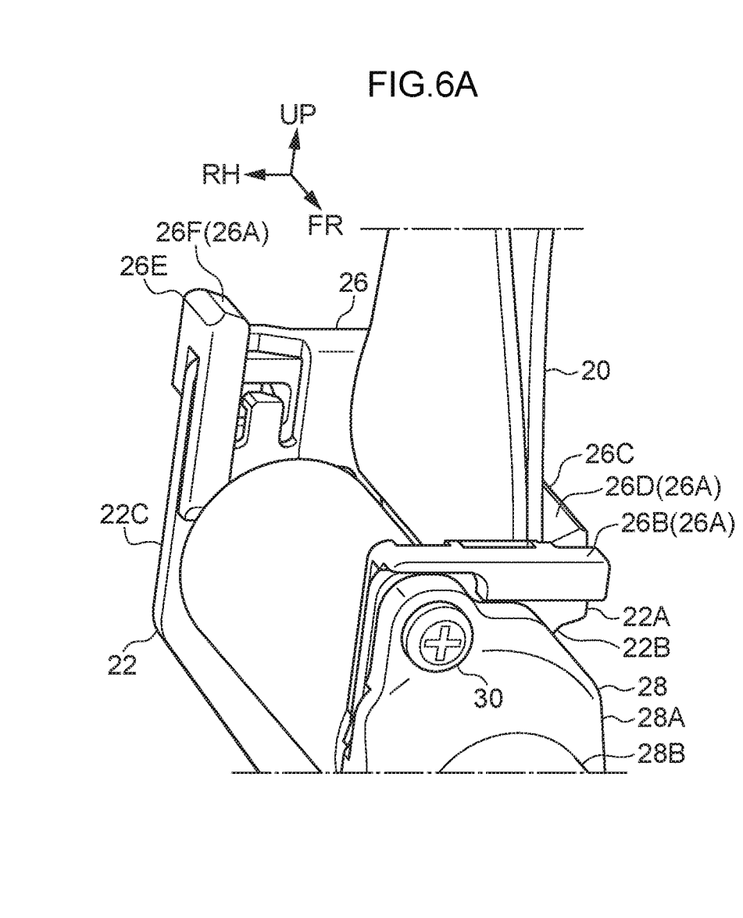
FIG. 6A is a perspective view illustrating a protector and the like of the buckle device according to the embodiment of the invention as viewed from a diagonally front right.
Figure 6B:
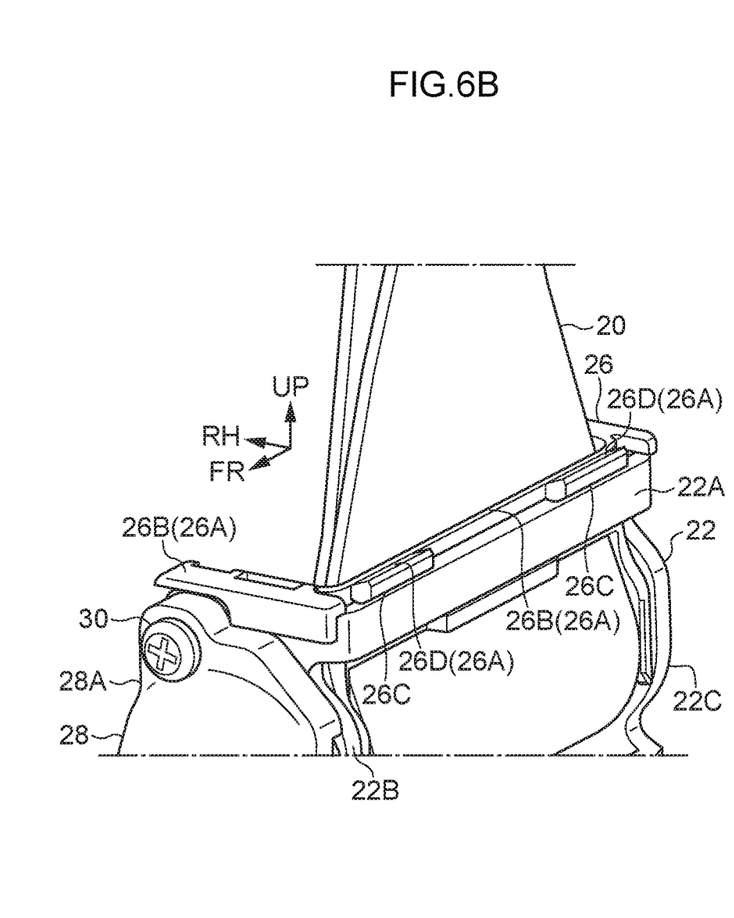
FIG. 6B is a perspective view illustrating the protector and the like of the buckle device according to the embodiment of the invention as viewed from a diagonally front left.
Figure 7A:
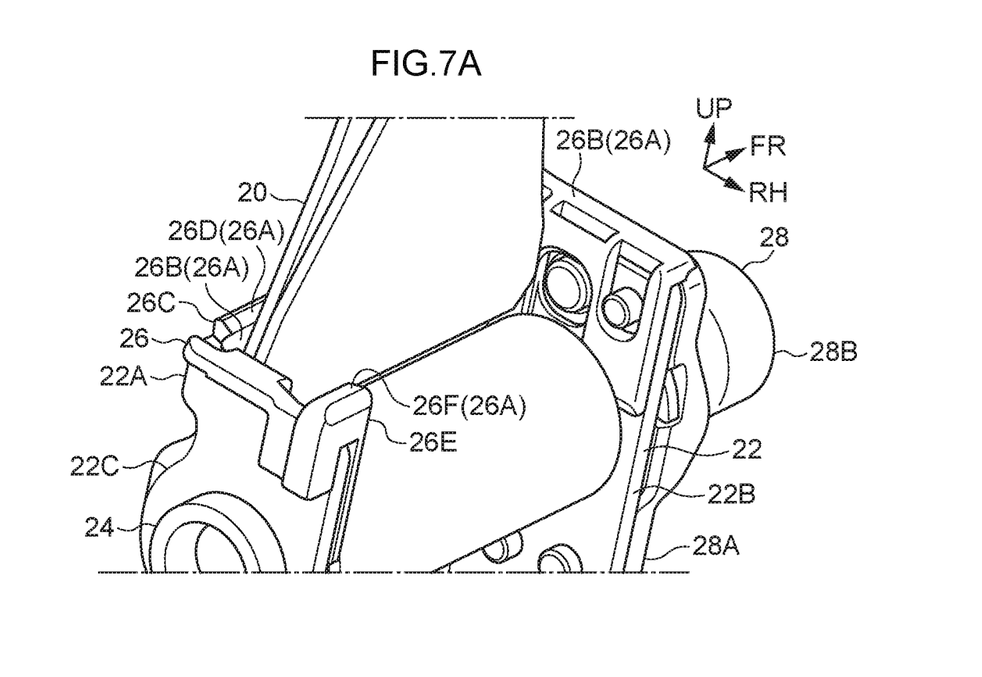
FIG. 7A is a perspective view illustrating the protector and the like of the buckle device according to the embodiment of the invention as viewed from a diagonally rear right.
Figure 7B:
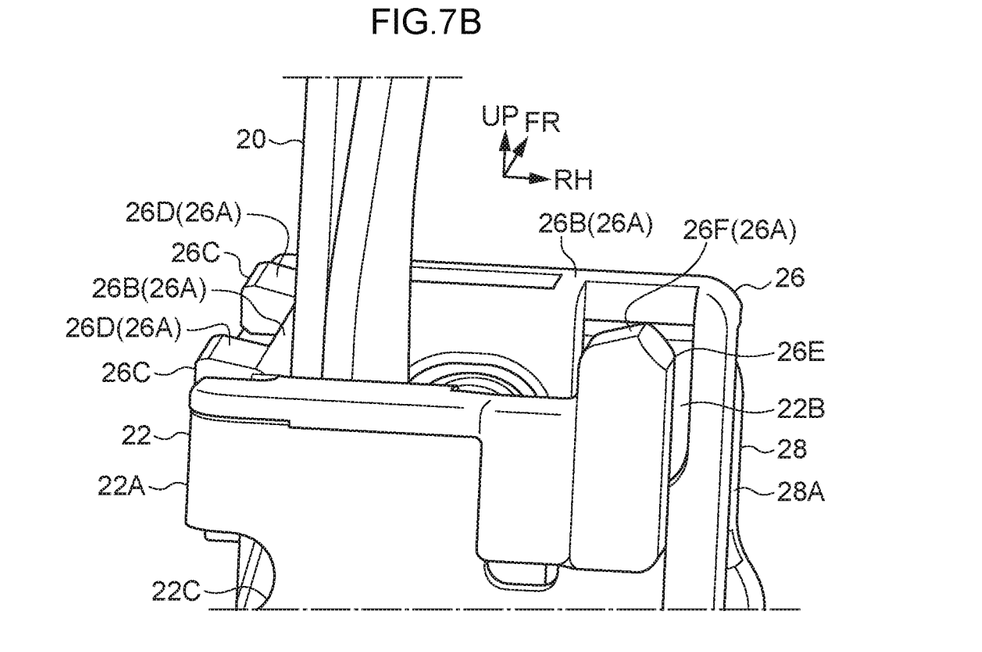
FIG. 7B is a perspective view illustrating the protector and the like of the buckle device according to the embodiment of the invention as viewed from a rear side.
Figure 8A:
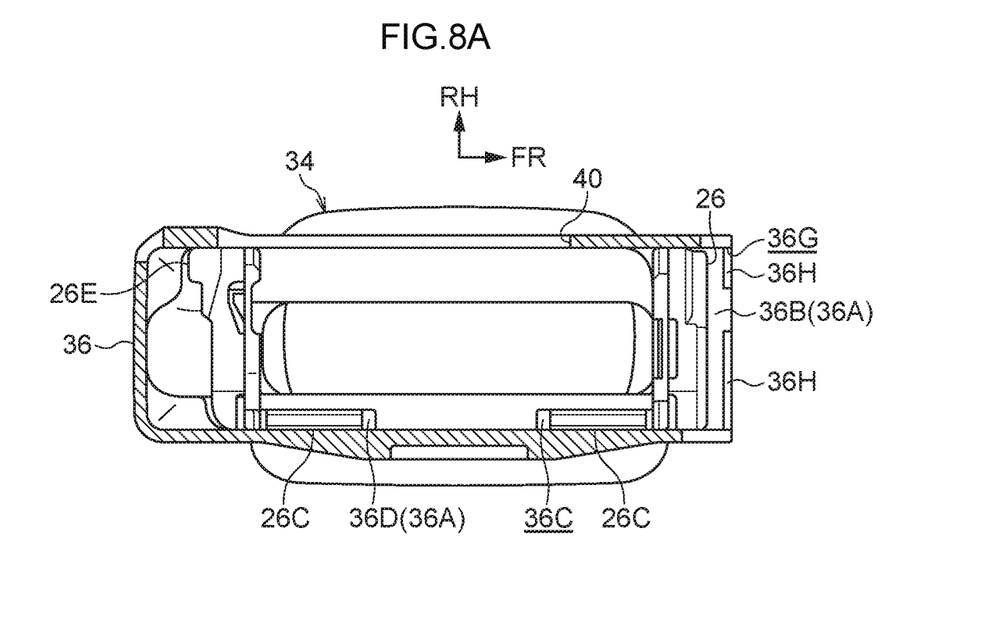
FIG. 8A is a view illustrating the boot and the protector of the buckle device according to the embodiment of the invention as viewed from a bottom.
Figure 8B:
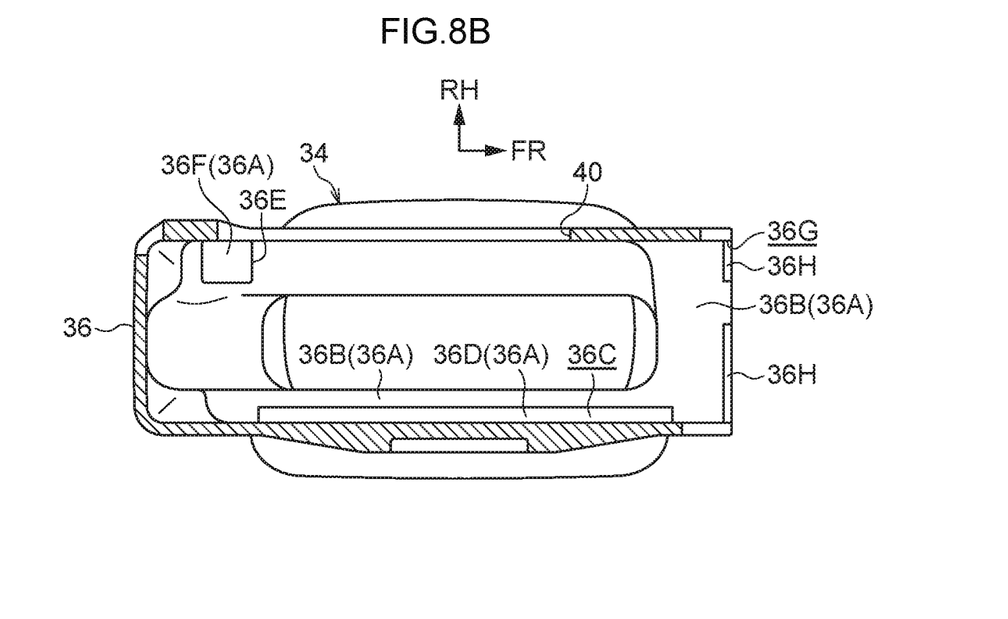
FIG. 8B is a view illustrating the boot of the buckle device according to the embodiment of the invention as viewed from the bottom.
Figure 9A:
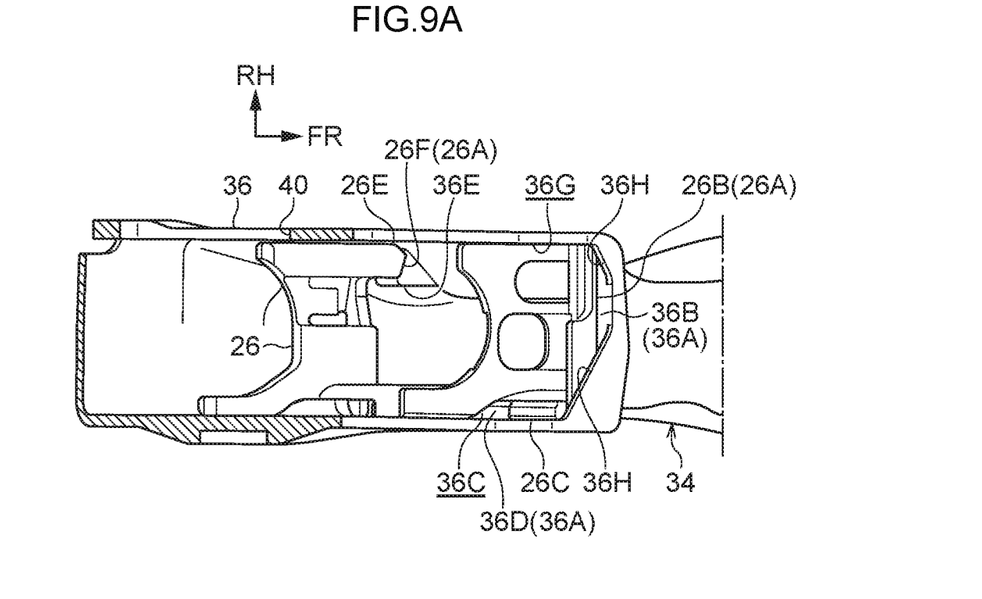
FIG. 9A is a view illustrating the boot and the protector of the buckle device according to the embodiment of the invention as viewed from a diagonally front bottom.
Figure 9B:
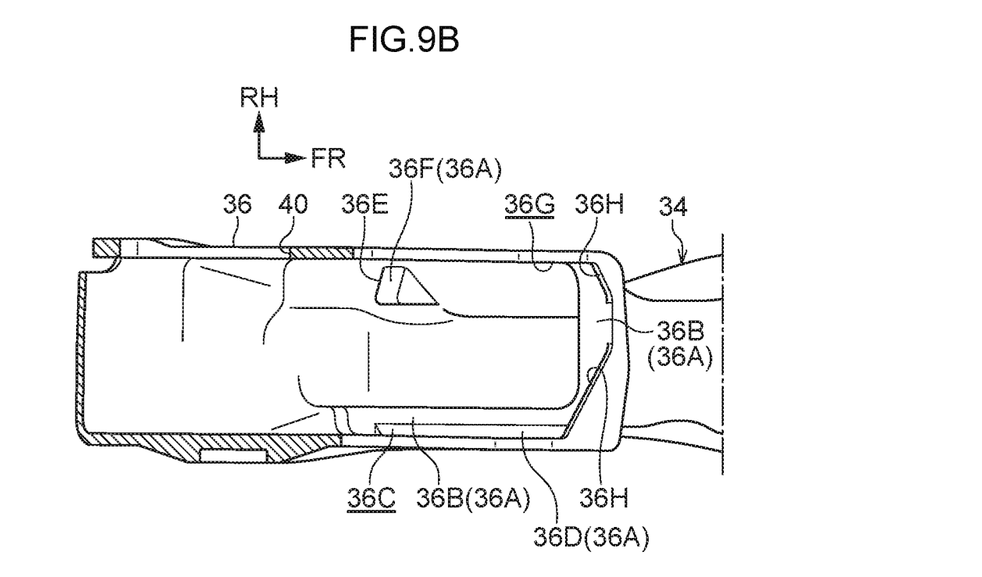
FIG. 9B is a view illustrating the boot of the buckle device according to the embodiment of the invention as viewed from the diagonally front bottom.

A torsion shaft 32 (see FIG. 4) that is made of metal and has a substantially circular columnar shape as a deformation member (energy absorbing member) is coaxially disposed in the case 28. The front end part of the torsion shaft 32 is locked to the front end part in the locking cylinder 28B in a relatively non-rotatable manner. The rear end part of the torsion shaft 32 is coupled to the spool 24 in a relatively non-rotatable manner to restrict the rotation of the spool 24.

A boot 34 (see FIGS. 8A, 8B, 9A, and 9B) having a substantially rectangular cylindrical shape as a holding member is provided in a range from the buckle body 18 to the frame 22. The boot 34 is made of soft resin and has flexibility (elasticity). In the boot 34, the axial direction is set to be the up-down direction, and a dimension in the right-left direction is smaller than a dimension in the front-rear direction. A thickness direction of the boot 34 is set to be the right-left direction. The upper part of the boot 34 gradually becomes smaller downward in the right-left direction. The boot 34 holds the buckle body 18 in a manner such that the lower side part of the buckle body 18 is fitted into the upper part of the boot 34 to restrict the downward movement of the buckle body 18.

A lower part of the boot 34 is made to serve as an accommodation part 36. The accommodation part 36 protrudes forward and leftward with respect to a part immediately above the boot 34. An upper support surface 36B that constitutes a support target surface 36A and has a substantially L-shape in bottom view is formed on the upper surfaces of the front part and the left part of the inside of the accommodation part 36. The upper support surface 36B is disposed vertically in the up-down direction. A predetermined number (one in the embodiment) of support groove 36C having a substantially triangular columnar shape is formed in the left side part of the upper surface left part in the accommodation part 36. The support groove 36C extends in the front-rear direction. An upper-left inclined surface 36D as an inclination part constituting the support target surface 36A is formed on the upper surface (bottom surface) of the support groove 36C. The upper-left inclined surface 36D is inclined in a downward direction as being directed to the right (the inner side of the boot 34 in the right-left direction). A support protrusion 36E having a substantially triangular prism shape is integrally formed at the rear part of the right wall inner surface of the boot 34 immediately above the accommodation part 36. The support protrusion 36E protrudes leftward. An upper-right inclined surface 36F as the inclination part constituting the support target surface 36A is formed on the lower surface of the support protrusion 36E. The upper-right inclined surface 36F is inclined in a downward direction as being directed to the left (the inner side of the boot 34 in the right-left direction).

An exposure hole 36G is formed to pass through a front wall (side wall) of the accommodation part 36 except for an upper and left corner part and an upper and right corner part. The exposure hole 36G exposes the inside of the accommodation part 36 to the front side. A covering wall 36H having a triangular plate shape as a covering part is formed at the upper and left corner part and the upper and right corner part of the front wall of the accommodation part 36.

The belt 20 is inserted into the boot 34, and the frame 22 (including the spool 24) and the protector 26 are accommodated in the accommodation part 36. The exposure hole 36G of the accommodation part 36 exposes the leg plate 22B of the frame 22 and the front part of the protector 26 to the front side. The case 28 protrudes to the front side from the exposure hole 36G of the accommodation part 36 (see FIGS. 3 and 4). The covering wall 36H on the left side of the accommodation part 36 covers the front side of the leg plate 22B and the protector 26, and the covering wall 36H on the right side of the accommodation part 36 covers the front side of the protector 26.

The upper support surface 36B, the upper-left inclined surface 36D, and the upper-right inclined surface 36F of the boot 34 are supported from the lower side by the lower support surface 26B, the lower-left inclined surface 26D, and the lower-right inclined surface 26F of the protector 26, respectively. As a result, the boot 34 is supported from the lower side by the protector 26 and the frame 22, and the downward movement of the boot 34 is restricted. An elastic contraction force is applied to the boot 34 between the buckle body 18 and the protector 26 in a state where the belt 20 is wound around the spool 24 as described above, and thus the tension is applied to the belt 20. The boot 34 biases the protector 26 and the frame 22 downward to be self-standing with respect to the protector 26 and the frame 22 and biases the buckle body 18 upward to be self-standing.

A clip 38 that is made of hard resin and has a substantially columnar shape as a fixing member passes through a lower end part of the left wall of the boot 34 (accommodation part 36) and the back plate 22A of the frame 22. A proximal end (left end) of the clip 38 is made in a substantially elliptical plate shape, and a distal end part (right end part) of the clip 38 is formed in a substantially trapezoidal columnar shape. The axial direction of the distal end part of the clip 38 is set to be the front-rear direction, and the distal end part of the clip 38 protrudes upward and downward. After the distal end part of the clip 38 is temporarily elastically reduced in the up-down direction and passes through the left wall of the boot 34 and the back plate 22A of the frame 22, the distal end part is caused to pass through the left wall of the boot 34 and the back plate 22A to be elastically expanded (elastically restored) in the up-down direction. Therefore, the left wall of the boot 34 and the back plate 22A of the frame 22 are sandwiched between the proximal end and the distal end part of the clip 38, and the left wall of the boot 34 is fixed to the back plate 22A of the frame 22 by the clip 38, whereby tilting of the boot 34 rightward is prevented.

A fixing piece 40 (see FIGS. 5A, 5B, and 5C) having a long plate shape as a fixing part is integrally formed at a front end part of the right wall of the boot 34, and the fixing piece 40 is extended downward. The fixing piece 40 is bent leftward along the lower and right corner part of the leg plate 22B of the frame 22 at the proximal end part, and a part on the distal end side of the fixing piece 40 from the proximal end part is extended in the downward direction as being directed leftward.

A hook hole 40A having an elongated rectangular shape as a hooking target part is formed to penetrate an intermediate part (intermediate part in the longitudinal direction) of the fixing piece 40, and the hook hole 40A is extended in the longitudinal direction of the fixing piece 40. The hook protrusion 22D of the leg plate 22B passes through the hook hole 40A. The left surface of the hook hole 40A approaches or abuts on a proximal-end side part of the hook protrusion 22D, and the hook protrusion 22D is fitted to the hook hole 40A in the front-rear direction. The distal-end side part of the fixing piece 40 from the hook hole 40A can abut on the distal end part of the hook protrusion 22D, and the downward movement of the distal-end side part of the fixing piece 40 from the hook hole 40A is restricted by the distal end part of the hook protrusion 22D. As a result, the fixing piece 40 (hook hole 40A) is hooked on the hook protrusion 22D.

The intermediate part of the fixing piece 40 is inserted into the locking hole 28C of the case 28 (locking plate 28A) in a part including the front side part from the hook hole 40A, and the lower surface of the locking hole 28C locks the downward movement of the intermediate part of the fixing piece 40. A part of the locking plate 28A below the locking hole 28C approaches or abuts on the hook protrusion 22D of the leg plate 22B. As a result, leftward tilting of the boot 34 is suppressed by fixing the fixing piece 40 to the frame 22.

Figure 2:
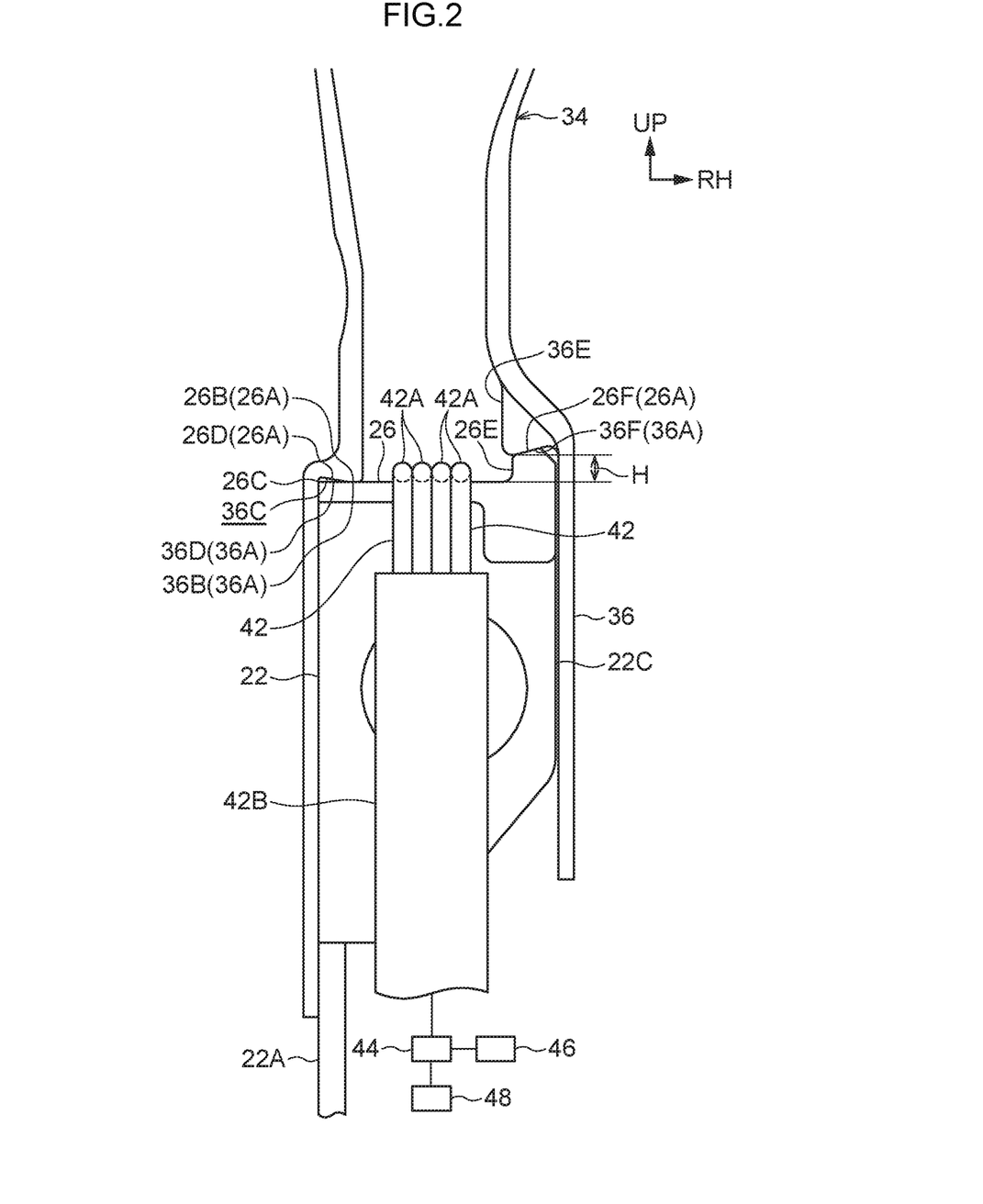
FIG. 2 is a rear view illustrating an inside of the buckle device according to the embodiment of the invention as viewed from the rear.
Figure 3:
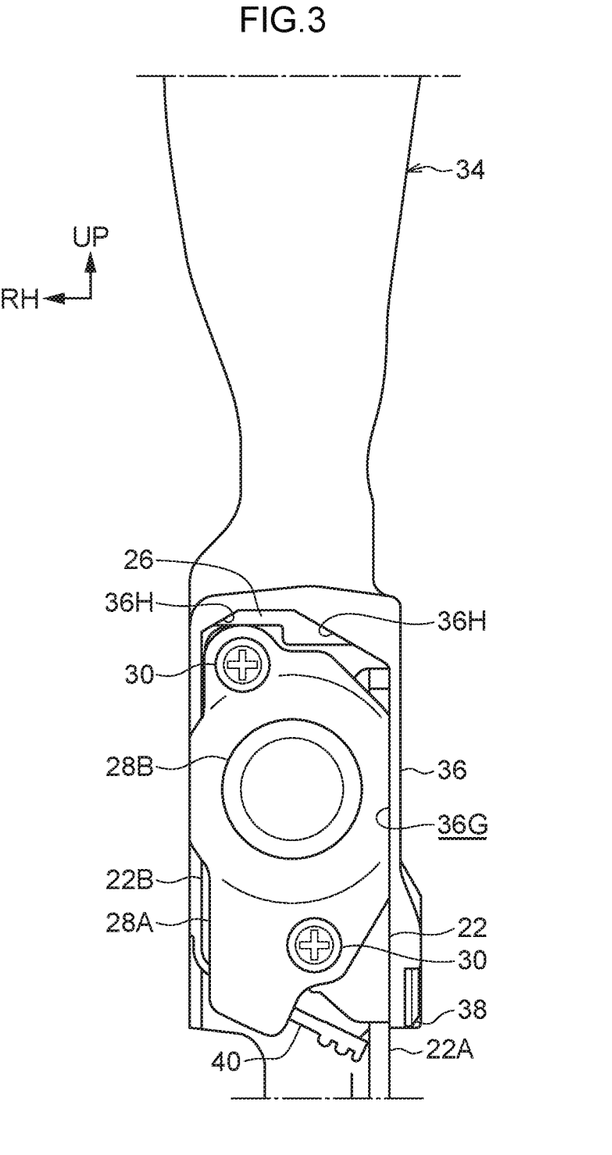
FIG. 3 is a front view illustrating the buckle device according to the embodiment of the invention as viewed from a front.

One end of a pair of wire harnesses 42 (wiring, see FIG. 2) is electrically connected to the buckle switch in the buckle body 18. The wire harness 42 is routed below the boot 34 from the lower end of the buckle body 18 through the inside of the boot 34 (including a space between the rear wall of the boot 34, and the rear part of the protector 26 and the leg plate 22C of the frame 22). One end part of the wire harness 42 is disposed on the right side of the belt 20 above the protector 26 and is bent around the rear part of the protector 26. The wire harness 42 is provided with two (may be three or more) electric wires 42A. The electric wire 42A is made into, for example, an AVSS line (thin low-voltage electric wire for an automobile) and is provided with a sheath on the outer periphery. A vinyl tube 42B having a circular tubular shape as a covering tube is provided on the other end side from one end part of the pair of wire harnesses 42, and the vinyl tube 42B has flexibility. Four electric wires 42A are inserted into the vinyl tube 42B, and the four electric wires 42A are protected by the vinyl tube 42B. A diameter dimension of the electric wire 42A is smaller than a dimension H (see FIG. 2) in the up-down direction from the protrusion proximal end of the support column 26E to the lower end of the lower-right inclined surface 26F in the protector 26.

The buckle switch in the buckle body 18 is electrically connected to a control device 44 of the vehicle via the pair of wire harnesses 42. For example, an airbag device 46 and a warning device 48 of the vehicle are electrically connected to the control device 44. In a case in which the buckle switch does not detect the engagement of the tongue 16 with the buckle body 18 (the attachment of the webbing 14 to the occupant), the airbag device 46 is not actuated at the time of collision of the vehicle or the warning device 48 warns the occupant to urge the attachment of the webbing 14, under the control of the control device 44. In a case in which the buckle switch detects the engagement of the tongue 16 with the buckle body 18 (the attachment of the webbing 14 to the occupant), the airbag device 46 is actuated at the time of collision of the vehicle, and the warning device 48 does not warn the occupant to urge the attachment of the webbing 14, under the control of the control device 44.

Next, the action of the embodiment will be described.

In the seat belt device 12 having the above configuration, in the buckle device 10, the torsion shaft 32 restricts the rotation of the spool 24 to restrict the pull-out of the belt 20 from the spool 24 and the upward extension of the buckle body 18, and the webbing 14 is attached to the occupant by engaging the tongue 16 of the webbing 14 with the buckle body 18.

At the time of collision of the vehicle (in emergency), the locking mechanism of the winding device locks the pulling-out of the webbing 14 from the winding device, whereby the occupant is restrained by the webbing 14. For example, in a case in which an inertial force is applied to the occupant and the webbing 14 is pulled by the occupant, a pulling force from the spool 24 is applied to the belt 20 from the webbing 14 via the tongue 16 and the buckle body 18, whereby a rotational force is applied to the spool 24. The torsion shaft 32 is deformed to be twisted (plastically deformed) between the front end part and the rear end part by the rotational force applied to the spool 24, and the rotation of the spool 24 is allowed, so that the belt 20 is allowed to be pulled out from the spool 24 and the buckle body 18 (including the tongue 16) is allowed to extend upward. Therefore, a load applied from the webbing 14 to the occupant (particularly, the chest part) is reduced (restricted to a load (force limiter load) twisted deformation of the torsion shaft 32), and kinetic energy of the occupant is absorbed by twisted deformation of the torsion shaft 32, whereby the occupant is protected.

The buckle body 18 is held in the upper part of the boot 34. The frame 22 and the protector 26 are accommodated in the accommodation part 36 below the boot 34. The upper support surface 36B, the upper-left inclined surface 36D, and the upper-right inclined surface 36F of the support target surface 36A of the boot 34 are supported from the lower side by the lower support surface 26B, the lower-left inclined surface 26D, and the lower-right inclined surface 26F of the support surface 26A of the protector 26, respectively, and the boot 34 is supported from the lower side by the frame 22 and the protector 26.

Here, the upper-left inclined surface 36D and the upper-right inclined surface 36F of the boot 34 and the lower-left inclined surface 26D and the lower-right inclined surface 26F of the protector 26 are inclined in the downward direction (from the buckle body 18 side to the protector 26 side) as being directed to the inside of the boot 34 in the right-left direction (thickness direction). Therefore, for example, in a case in which a load from the occupant is input to the buckle body 18 and the boot 34 from the upper side, a displacement force toward the inner side of the protector 26 in the right-left direction can be applied to the boot 34 by the upper-left inclined surface 36D and the upper-right inclined surface 36F, and the lower-left inclined surface 26D and the lower-right inclined surface 26F. As a result, it is possible to suppress an occurrence of a situation in which the boot 34 is displaced to the outside of the protector 26 in the right-left direction, and thus the support of the boot 34 by the frame 22 and the protector 26 is released. It is possible to suppress the downward displacement of the boot 34 (to the side of the frame 22 and the protector 26 side) with respect to the frame 22 and the protector 26.

The upper-left inclined surface 36D and the upper-right inclined surface 36F are provided at the boot 34 (support target surface 36A), and the lower-left inclined surface 26D and the lower-right inclined surface 26F are provided at the protector 26 (support surface 26A). Therefore, it is possible to effectively apply a displacement force toward the inner side of the protector 26 in the right-left direction to the boot 34 by the upper-left inclined surface 36D and the upper-right inclined surface 36F, and the lower-left inclined surface 26D and the lower-right inclined surface 26F. It is possible to effectively suppress the downward displacement of the boot 34 with respect to the frame 22 and the protector 26.

Furthermore, the upper-left inclined surface 36D and the upper-right inclined surface 36F of the boot 34 (support target surface 36A) are supported by the lower-left inclined surface 26D and the lower-right inclined surface 26F of the protector 26 (support surface 26A), respectively. Therefore, it is possible to effectively apply a displacement force toward the inner side of the protector 26 in the right-left direction to the boot 34 by the upper-left inclined surface 36D and the upper-right inclined surface 36F, and the lower-left inclined surface 26D and the lower-right inclined surface 26F. It is possible to effectively suppress the downward displacement of the boot 34 with respect to the frame 22 and the protector 26.

In addition, the upper-left inclined surface 36D and the lower-left inclined surface 26D are provided on the left side (one side in the thickness direction of the boot 34) of the boot 34 and the protector 26, and the upper-right inclined surface 36F and the lower-right inclined surface 26F are provided on the right side (the other side in the thickness direction of the boot 34) of the boot 34 and the protector 26. Therefore, it is possible to effectively apply a displacement force toward the inner side of the protector 26 in the right-left direction to the boot 34 by the upper-left inclined surface 36D and the lower-left inclined surface 26D, and the upper-right inclined surface 36F and the lower-right inclined surface 26F. It is possible to effectively suppress the downward displacement of the boot 34 with respect to the frame 22 and the protector 26.

A plurality of lower-left inclined surfaces 26D are provided on the left side of the protector 26 (one side in the thickness direction of the boot 34). Therefore, it is possible to effectively apply the displacement force toward the inner side of the protector 26 in the right-left direction to the boot 34 by the plurality of lower-left inclined surfaces 26D, and it is possible to effectively suppress the downward displacement of the boot 34 with respect to the frame 22 and the protector 26.

The support target surface 36A and the support surface 26A are not provided on the front side and the left side (both sides in the boot 34 circumferential direction) of the upper-right inclined surface 36F and the lower-right inclined surface 26F. Therefore, even in a case in which the support target surface 36A and the support surface 26A are not provided on the front side and the left side of the upper-right inclined surface 36F and the lower-right inclined surface 26F, it is possible to apply the displacement force toward the inner side of the protector 26 in the right-left direction to the boot 34 by the upper-right inclined surface 36F and the lower-right inclined surface 26F. It is possible to suppress the downward displacement of the boot 34 with respect to the frame 22 and the protector 26.

In addition, the exposure hole 36G of the boot 34 (accommodation part 36) exposes the leg plate 22B of the frame 22 and the protector 26 to the front side, and the covering wall 36H of the accommodation part 36 covers the front side of at least one of the leg plate 22B or the protector 26. Therefore, in a case in which the boot 34 is subjected to the displacement force toward the inner side of the protector 26 in the right-left direction, it is possible to suppress the occurrence of a situation in which the frame 22 and the protector 26 come out from the exposure hole 36G, by the covering wall 36H, to suppress the displacement of the boot 34 to the inner side of the protector 26 in the right-left direction, and to suppress the downward displacement of the boot 34 with respect to the frame 22 and the protector 26.

The diameter dimension of the electric wire 42A of the wire harness 42 is smaller than the dimension H in the up-down direction from the protrusion proximal end of the support column 26E to the lower end of the lower-right inclined surface 26F in the protector 26. Therefore, it is possible to restrict sandwiching of the electric wire 42A between the upper-right inclined surface 36F of the boot 34 and the lower-right inclined surface 26F of the protector 26 by the support column 26E.

In the embodiment, a plurality of inclination parts (lower-left inclined surface 26D) is provided on the left side (one side in the thickness direction of the boot 34) of the protector 26. Along with or instead of this, a plurality of inclination parts may be provided on the left side (one side in the thickness direction of the boot 34) of the boot 34, a plurality of inclination parts may be provided on the right side (one side in the thickness direction of the boot 34) of the protector 26, and a plurality of inclination parts may be provided on the right side (one side in the thickness direction of the boot 34) of the boot 34.

In addition, in the embodiment, the inclination part (the lower-left inclined surface 26D and the upper-left inclined surface 36D) is provided on the left side (one side in the thickness direction of the boot 34) of the boot 34 and the protector 26, and the inclination part (the lower-right inclined surface 26F and the upper-right inclined surface 36F) is provided on the right side (the other side in the thickness direction of the boot 34) of the boot 34 and the protector 26. The inclination part may be provided on the left side or the right side (one side in the thickness direction of the boot 34) of the boot 34 and the protector 26.

Further, in the embodiment, the boot 34 (support target surface 36A) is provided with the inclination part (the upper-left inclined surface 36D and the upper-right inclined surface 36F), and the protector 26 (support surface 26A) is provided with the inclination part (the lower-left inclined surface 26D and the lower-right inclined surface 26F). The inclination part only has to be provided on at least one of the boot 34 (support target surface 36A) or the protector 26 (support surface 26A).

In the embodiment, the spool 24 is provided in the frame 22. The belt 20 may be coupled to the frame 22 without providing the spool 24 in the frame 22. In this case, the torsion shaft 32 does not need to be provided.

In the embodiment, the deformation member is the torsion shaft 32. The deformation member may be a member other than the torsion shaft 32.

In the embodiment, four electric wires 42A are provided. One or more electric wires 42A only has to be provided.

What is claimed is:

1. A buckle device comprising:
    a buckle body configured to engage with a tongue provided at a webbing attached to an occupant;
    a holding member that holds the buckle body at an internal portion and is provided with a support target surface at the internal portion;
    a support that is provided with a support surface and supports the holding member in a manner such that the support surface supports the support target surface; and
    an inclination part that is provided at at least one of the support target surface or the support surface and is inclined in a direction from a buckle body side toward a support side as being directed inward in a holding-member thickness direction.

2. The buckle device according to claim 1, wherein the inclination part is provided at the support target surface and the support surface.

3. The buckle device according to claim 2, wherein the inclination part at the support surface supports the inclination part at the support target surface.

4. The buckle device according to claim 1, wherein the inclination part is provided on both sides in the holding-member thickness direction.

5. The buckle device according to claim 1, wherein a plurality of the inclination parts are provided on one side in the holding-member thickness direction.

6. The buckle device according to claim 1, wherein the support target surface and the support surface are not provided on both sides of the inclination part in a holding-member circumferential direction.

7. The buckle device according to claim 1, further comprising:
    an accommodation part that is provided at the holding member and accommodates the support; an exposure hole that is provided at a side wall of the accommodation part and exposes the support; and a covering part that is provided at the side wall and covers the support.

8. The buckle device according to claim 1, wherein the holding member has flexibility.

9. The buckle device according to claim 1, wherein the holding member is fixed to the support.

10. A buckle device comprising:
    a buckle body configured to engage with a tongue provided at a webbing attached to an occupant;
    a holding member that holds the buckle body and is provided with an accommodation part;
    a support that is accommodated in the accommodation part from a side opposite to the buckle body and supports the holding member;
    an exposure hole that is provided at a side wall of the accommodation part and exposes the support; and
    a covering part that is provided at the side wall and covers the support.

* * * * *